(12) United States Patent
Schillinger et al.

(10) Patent No.: US 7,876,206 B2
(45) Date of Patent: Jan. 25, 2011

(54) PROCEDURE AND FACILITY FOR TRANSMISSION BETWEEN A CONTROL DEVICE AND A WHEEL MODULE

(75) Inventors: Jakob Schillinger, Gaimersheim (DE); Karl-Heinz Hahn, Böhmfeld (DE); Jörg Lehmann, Hannover (DE)

(73) Assignee: Conti Temic Microelectronic GMBH, Nuremberg (DE)

( * ) Notice: Subject to any disclaimer, the term of this patent is extended or adjusted under 35 U.S.C. 154(b) by 1058 days.

(21) Appl. No.: 11/547,224

(22) PCT Filed: Dec. 21, 2004

(86) PCT No.: PCT/DE2004/002781

§ 371 (c)(1),
(2), (4) Date: Oct. 2, 2006

(87) PCT Pub. No.: WO2005/101685

PCT Pub. Date: Oct. 27, 2005

(65) Prior Publication Data

US 2008/0272900 A1 Nov. 6, 2008

(30) Foreign Application Priority Data

Apr. 1, 2004 (DE) ........................ 10 2004 016 833
Jun. 24, 2004 (DE) ........................ 10 2004 030 671
Oct. 30, 2004 (DE) ........................ 10 2004 052 737

(51) Int. Cl.
*B60C 23/00* (2006.01)

(52) U.S. Cl. ...................... 340/447; 340/443; 340/445; 340/442; 73/146

(58) Field of Classification Search .................. 340/447, 340/442, 825.49, 10.1, 444, 10.52, 445, 448, 340/10.3, 10.4; 73/146, 146.5; 116/34 R
See application file for complete search history.

(56) References Cited

U.S. PATENT DOCUMENTS 4,067,235 A * 1/1978 Markland et al. .......... 73/146.5
4,758,836 A * 7/1988 Scuilli ................... 340/870.31
5,491,468 A * 2/1996 Everett et al. ............ 340/10.34

(Continued)

FOREIGN PATENT DOCUMENTS

DE     19630302     4/1997

(Continued)

*Primary Examiner*—George A Bugg
*Assistant Examiner*—Hoi C Lau (57) ABSTRACT

The procedure and the facility are used for wireless transmission between a wheel module (9) arranged in a tire (2) and an external control device (3). A first transmission signal is transmitted from an antenna (6) of the control device (3) to an antenna (11) of the wheel module (9). Data is transmitted via a second transmission signal from the wheel module (9) to the control device (3), whereby the first transmission signal has a different frequency from the second transmission signal. The first transmission signal is received by the antenna (11) of the wheel module (9) during a coupling period, within which while the tires (2) are rotating, an area of influence (15) of the antenna (11) of the wheel module (9) which also rotates, and a stationary area of influence (14) of the antenna (6) of the control device (3) overlap. After the beginning of the coupling period is recognised, the data transmission is started from the wheel module (9) to the control device (3).

11 Claims, 5 Drawing Sheets

U.S. PATENT DOCUMENTS

| | | | | |
|---|---|---|---|---|
| 6,034,597 | A * | 3/2000 | Normann et al. | 340/447 |
| 6,112,165 | A * | 8/2000 | Uhl et al. | 702/138 |
| 6,169,480 | B1 * | 1/2001 | Uhl et al. | 340/442 |
| 6,218,937 | B1 * | 4/2001 | Delaporte | 340/447 |
| 6,462,647 | B1 * | 10/2002 | Roz | 340/10.1 |
| 6,622,552 | B1 * | 9/2003 | Delaporte | 73/146 |
| 6,710,708 | B2 * | 3/2004 | McClelland et al. | 340/442 |
| 6,748,797 | B2 * | 6/2004 | Breed et al. | 73/146 |
| 6,791,457 | B2 * | 9/2004 | Shimura | 340/448 |
| 6,828,905 | B2 * | 12/2004 | Normann et al. | 340/447 |
| 6,871,250 | B2 * | 3/2005 | Froeschl et al. | 710/110 |
| 6,972,671 | B2 * | 12/2005 | Normann et al. | 340/442 |
| 7,015,801 | B1 * | 3/2006 | Juzswik | 340/442 |
| 7,088,226 | B2 * | 8/2006 | McClelland et al. | 340/442 |
| 7,336,644 | B2 * | 2/2008 | Berndt et al. | 370/350 |
| 7,421,891 | B2 * | 9/2008 | Katou | 73/146.8 |
| 7,536,152 | B2 * | 5/2009 | Inano et al. | 455/41.2 |
| 7,557,766 | B2 * | 7/2009 | Kawase et al. | 343/788 |
| 2002/0067285 | A1 * | 6/2002 | Lill | 340/870.11 |
| 2003/0058118 | A1 * | 3/2003 | Wilson | 340/679 |
| 2003/0156025 | A1 * | 8/2003 | Okubo | 340/447 |
| 2004/0206168 | A1 * | 10/2004 | Katou et al. | 73/146 |
| 2005/0275517 | A1 * | 12/2005 | Tsukamoto et al. | 340/442 |
| 2007/0018837 | A1 * | 1/2007 | Mizutani et al. | 340/635 |
| 2009/0195373 | A1 * | 8/2009 | Lettieri et al. | 340/447 |

FOREIGN PATENT DOCUMENTS

| | | |
|---|---|---|
| EP | 1026015 | 8/2000 |
| JP | 09/237398 | 9/1997 |
| JP | 2004/268612 | 9/2004 |
| WO | 2004/074016 | 9/2004 |

* cited by examiner

PROCEDURE AND FACILITY FOR TRANSMISSION BETWEEN A CONTROL DEVICE AND A WHEEL MODULE

BACKGROUND OF THE INVENTION

The invention relates to a procedure and a facility for wireless transmission between a wheel module arranged in a tire and a control device arranged outside the tire by a procedure for wireless transmission between a wheel module (9) arranged in a tire (2) and a control device (3; 28) arranged outside the tire (2), in which a first transmission signal (S1) is transferred from an antenna (6) of the control device (3; 28) to an antenna (11) of the wheel module (9). Data is transmitted via a second transmission signal (S2) from the wheel module (9) to the control device (3; 28), and for the first transmission signal (S1) a different frequency (f1) is provided than for the second transmission signal (S2). Also, a facility for wireless transmission between a wheel module (9) arranged in a tire (2) and a control device (3; 28) arranged outside the tire (2), in which the control device (3; 28) comprises an antenna (6) for the transmission of a first transmission signal (S1), the wheel module (9) comprises an antenna (11) for receiving the first transmission signal (S1). Devices (7, 10, 17) for transmitting data from the wheel module (9) to the control device (3; 28) using a second transmission signal (S2) are provided, and the antennae (6, 11) for transmitting and receiving the first transmission signal (S1) are designed for a different frequency (f1) than the means (7, 10, 17) for transmitting data from the wheel module (9) to the control device (3; 28).

In motor vehicle technology, a procedure and a facility for bi-directional data transfer between an electronic transponder which has been vulcanised into a tire and an external control device is already known to be suitable for use, for example from DE 199 24 830 A1. The transponder forms a wheel module together with an external antenna in the form of a coil which runs around the side wall of the tire. This antenna is designed together with its counterpiece on the side of the control device for data communication in both directions, and also for a transfer of power to the wheel module. The simultaneous adaptation of the transfer means to these different functions is often only possible with difficulty.

A tire pressure remote monitoring system and a related procedure is known from EP A2 1 026 015. This system enables the automatic recording of the position and pressure of the tire. From a remote localised trigger (stimulus) with a primary coil, a low-frequency signal from a secondary coil is transmitted to a tire monitoring unit. As a response to the low-frequency signal, a relatively high-frequency signal which contains data is transmitted. The data is received by the stimulus and loaded into an evaluation unit.

The object of the invention is therefore to provide a procedure of the category type in such a manner that it can be flexibly adapted to the different requirements.

SUMMARY OF THE INVENTION

This object is attained according to the invention by a procedure for wireless transmission between a wheel module (9) arranged in a tire (2) and a control device (3; 28) arranged outside the tire (2), in which a first transmission signal (S1) is transferred from an antenna (6) of the control device (3; 28) to an antenna (11) of the wheel module (9). Data is transmitted via a second transmission signal (S2) from the wheel module (9) to the control device (3; 28), and for the first transmission signal (S1) a different frequency (f1) is provided than for the second transmission signal (S2). In the process the first transmission signal (S1), during a coupling period (TK) within which when the tires (2) are rotating, an also rotating sphere of influence (15) of the antenna (11) of the wheel module (9) and a stationary sphere of influence (14) of the antenna (6) of the control device (3; 28) partially overlap, is received by the antenna (11) of the wheel module (9); the beginning of the coupling period (TK) is recognised by the wheel module (9); and the data transmission from the wheel module (9) to the control device (3; 28) is started after the coupling period (TK) begins. Through the use of different frequencies for the transmission signal first transmitted from the control unit and the second transmission signal transmitted from the wheel module, a decoupling of the two transfer directions results. This applies in particular when the frequencies differ from each other by at least 2 to 3 units. Then, the transfer can be designed separately and in a targeted manner in each direction in accordance with the respective requirements. Thus, for the outward channel (=down link), i.e. for the transfer to the wheel module, only a low data transfer rate is required, but with the additional option of transferring power, while for the return channel (=up link), i.e. for the transfer to the control device, a higher data transfer rate is required. By selecting a low frequency for the first transmission signal and for the transfer means of the outward channel, in particular in the range of several 10 kHz to several 100 kHz, and by selecting a higher frequency for the second transmission signal and for the transfer means of the return channel, in particular in the range of several 1 MHz to several 100 MHz, this can be achieved easily; requirements which otherwise would hardly be possible to meet without an available transmission channel. For the higher frequency, a value of between approximately 5 MHz and 15 MHz, or of at least 300 MHz, is particularly suitable.

The variant where the first transmission signal (S1), power is gained in order to supply the wheel module (9) can be operated autonomously. No special power source, for example in the form of battery which can only be operated for a finite period of time, is required.

The embodiment where the first transmission signal (S1) is transmitted from the control device (3; 28) at least partially overriding several coupling periods (TK) guarantees that a power storage unit, which is in particular essentially discharged when (re-) starting is charged initially using the first transmission signal, and the wheel module is thus switched into a ready-for-operation condition.

Due to the measure where a power storage unit (22) is charged and the data transmission from the wheel module (9) to the control device (3; 28) is started after a prespecified charging condition (LMAX) of the power storage unit (22) has been started, data transmission to the control device is prevented from occurring too early, i.e. it is started when the wheel module is not yet fully ready for operation. This avoids erroneous transmission.

The variants where the second transmission signal (S2) is transmitted with an extended data telegram when the power storage unit (22), assuming that a significant discharge has occurred, has achieved the prespecified charging condition (LMAX) or the second transmission signal (S2) is transmitted with a standard data telegram when a charging condition (L) of the power storage unit has not fallen below a prespecified charging condition threshold value (LMIN) since the previous data transmission from the wheel module (9) to the control device (3; 28) are characterised by their particular efficiency. An extended data telegram which contains additional information, is only transmitted in special situations which are characterised by a low discharge of the power storage unit, for example after a longer stopping period or after a wheel is changed. In particular after the vehicle is started, an extended data telegram is transmitted first. Otherwise, only the shorter standard data telegram, which contains in particular current measured values relating to the tire condition according to claim 8, is transmitted. This saves both power and transmission capacity.

The measure where a speed of the tire (2) or a size which is proportional to it is recorded and compared with a speed threshold value, and the second transmission signal (S2) can be transmitted with an extended data telegram in particular only when the speed threshold value is not reached can be provided as an alternative or as an option. With an increasing speed, the duration of the coupling rate decreases, so that potentially, not enough time remains for the transmission of an extended data telegram. It is therefore preferred that only the standard data telegram is transmitted from a certain speed onwards. As a result, no loss of information occurs, since in the extended data telegram, the additional information contained has already been transferred after starting and/or when the speed is low, and does not change while driving.

The variant where data from the control device (3; 28) to the wheel module (9) is transmitted by means of the control device (3; 28) and after an at least partial reception of the second transmission signal (S2) in the first transmission signal (S1), a prespecified interruption is executed, or a prespecified zero sequence is transmitted; the first transmission signal (S1) is then loaded with the data to be transmitted from the control device (3; 28) to the wheel module (9) and in the wheel module (9); the interruption or zero sequence is recognised in the first transmission signal (S1) and the first transmission signal (S1) is received with the data from the control device (3; 28); enables in a simple manner the transmission of both power and data to the wheel module.

According to the embodiment where the first and the second transmission signal (S1, S2) is transmitted or received using a ground antenna (29) of the control device (28) arranged in a road surface (30), the control device can also be arranged outside the vehicle. It is also possible to attach the corresponding antenna(e) to a position at which the tire with the tire module moves past. This makes it possible to communicate with the wheel module easily, for example at an exit from an industrial premises or in a production hall. Here, the integration of the antenna(e) of the control device as ground antenna(e) into the road surface is advantageous.

A further object of the invention is to provide a facility of this category type in such a manner that it can be flexibly adapted to the different requirements.

This object is attained according to the invention by a facility for wireless transmission between a wheel module (9) arranged in a tire (2) and a control device (3; 28) arranged outside the tire (2) in which the control device (3; 28) comprises an antenna (6) for the transmission of a first transmission signal (S1); the wheel module (9) comprises an antenna (11) for receiving the first transmission signal (S1); means (7, 10, 17) for transmitting data from the wheel module (9) to the control device (3; 28) using a second transmission signal (S2) are provided; and the antennae (6, 11) for transmitting and receiving the first transmission signal (S1) are designed for a different frequency (f1) than the means (7, 10, 17) for transmitting data from the wheel module (9) to the control device (3, 28). The antenna (6) for transmitting the first transmission signal (S1) comprise a control device area of influence (14), and the antenna (11) for receiving the first transmission signal (S1) comprises a wheel module area of influence (15), so that when the tires (2) are rotating, a coupling exists between the wheel module (9) and the control device (3, 28) when the also rotating wheel module area of influence (15) and the stationary control device area of influence (14) at least partially overlap, and the wheel module (9) comprises means (18, 19) for recognising the begin of the coupling between the wheel module (9) and the control device (3, 28) and for initiating the data transmission from the wheel module (9) to the control device (3, 28) after it has detected the beginning of the coupling.

BRIEF DESCRIPTION OF THE DRAWINGS

Further features, advantages and details of the invention are described below using exemplary embodiments with reference to the drawing, in which.

DETAILED DESCRIPTION OF THE DRAWINGS

Parts which correspond to each other in FIGS. 1 to 10 are assigned the same reference numerals.

Figure 1:
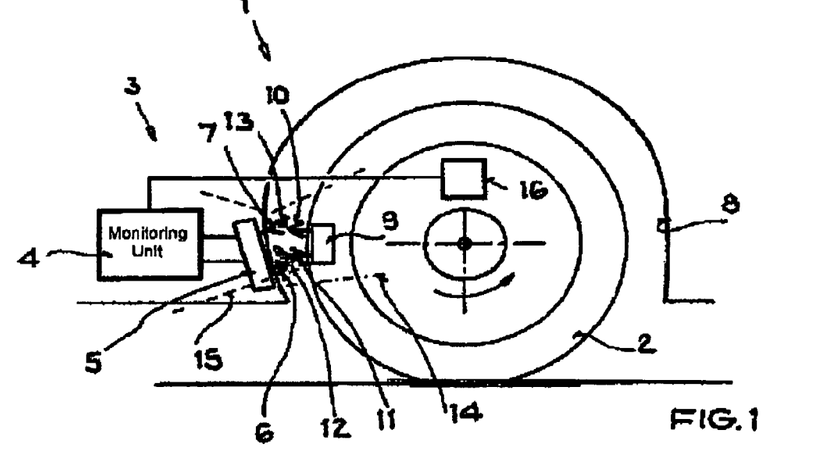
FIG. 1 shows an exemplary embodiment of a facility for transmitting data between a control device in the wheel housing and a wheel module.

The exemplary embodiment shown in FIG. 1 of a facility 1 for data transmission is a sensor transponder system used in a motor vehicle for transmitting sensor data from a tire 2 of the motor vehicle to a control device 3. The latter contains a stationary monitoring unit 4 and a stationary transmission/receiving unit 5 which is electrically connected to the stationary monitoring unit 4, with a LF (=Low Frequency) transmission antenna 6 and a HF (=High Frequency) receiving antenna 7. The stationary control device 4 and the transmission/receiving unit 5 can be designed as a combined component. The control device 3 or at least its transmission/receiving unit 5 is mounted in a wheel housing 8 of the tire 2. It is assigned a wheel module 9 which is attached within the tire 2 on the inner side of the running surface, with a HF transmission antenna 10 and a LF receiving antenna 11.

Between the LF transmission antenna 6 and the LF receiving antenna 11 on the one hand, the HF transmission antenna 10 and the HF receiving antenna 7 on the other, there is in each case a wireless transmission channel 12 and 13. The transmission channel 12 (=down link) has a low frequency and the transmission channel 13 (=up link) has a high frequency. The LF transmission antenna 6 and the LF receiving antenna 11 which are designed for a lower frequency f1 are in each case formed as a wire-wound air-core coil, while in contrast, the HF transmission antenna 10 and the HF receiving antenna 7 which are designed for a higher frequency f2 are in each case formed as a coil consisting of at least one circuit board loop. In principle, the HF transmission antenna 10 and the HF receiving antenna 7 can also be designed as a wound (air-core) coil. In any case, the connection is made via the transmission channels 12 and 13, in each case essentially due to magnetic coupling.

The LF and HF transmission antenna 6 and 10, and the LF and HF receiving antenna 11 and 7 each have an area of influence characteristic to them, into which they can transmit or in which they can receive. In the exemplary embodiment according to FIG. 1, the LF transmission antenna 6 and the HF transmission antenna 7 of the stationary transmission/receiving unit 5 are designed in such a manner that their areas of influence are essentially identical, despite their different operating frequencies, and the control device 3 comprises an essentially uniform control device area of influence 14 for the transmission and receiving direction. The same applies to the wheel module 9. This has an essentially uniform wheel module area of influence 15 for the transmission and receiving direction. In general, the areas of influence of the LF antennae and those of the HF antennae can separate from each other.

On the monitoring unit 4, a speed sensor 16 which is arranged on the tire 2 in order to record the speed, is connected. The speed sensor 16 is optional.

In the exemplary embodiment, a wheel module 9 and a control device 3 is provided for each tire 2. In general, however, a shared control device 3 can also be provided for several tires 2 and wheel modules 9. Then, several transmission/receiving units 5 are connected to a shared stationary monitoring unit 4.

When several control devices 3 are provided, they can be in a communication connection with each other, as well as with a superordinate vehicle control device not shown in FIG. 1, in particular via a data bus system. The individual wheel modules 9 are queried more or less in parallel or in series by the vehicle control system, depending on the querying interval and the speed of the data bus system.

Figure 2:
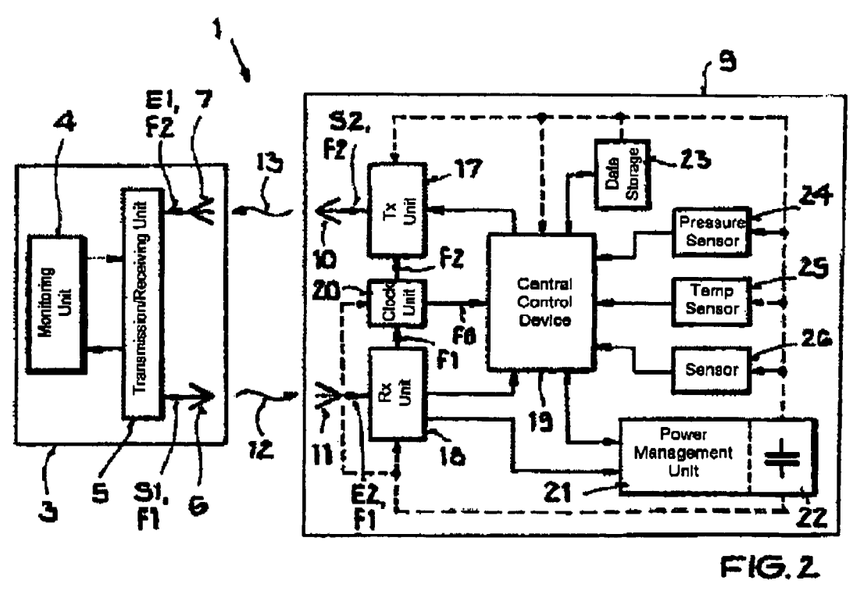
FIG. 2 shows a block diagram of the facility shown in FIG. 1.

The block diagram according to FIG. 2 shows primarily details of the wheel module 9 of the facility 1. The wheel module 9 comprises, alongside the HF transmission antenna 10 and the LF receiving antenna 11, a transmission unit 17, a receiving unit 18, a central control device 19, an internal clock unit 20, a power management unit 21 with a power storage unit 22 in the form of a buffer capacitor, a permanent data storage unit 23 in the form of an $E^2PROM$ and a pressure sensor 24, a temperature sensor 25 and if necessary, additional sensors of which a sensor 26 is shown as an example.

Aside from the two antennae 10 and 11, if appropriate from the sensors 24, 25 and 26, and depending also on the arrangement of the power storage unit 22, the remaining components of the wheel module 9 are preferably designed as an integrated module, for example as an ASIC. This results in a very compact size, so that the wheel module 9 can be well housed on the inside of the tire 2.

The wheel module 9 is very flexible with regard to the potential utilisation and operating modes. For example, it can be designed for different (transmission/receiving) modulation procedures, data transmission rate, data coding procedures and transmission frequencies. This is achieved partially already during the hardware production stage, and partially only during the subsequent programming stage. Additional hardware and/or software functions can thus also be provided without any problem. For example, two safety inputs (ports) can be provided on the wheel module 9, which together with a short-circuit loop can be used to secure the wheel module 9 against unauthorised removal from the tire 2.

The functionality of the facility 1 will now be described below, also with reference to FIGS. 3 to 7.

From the transmission/receiving unit 5 of the control device 3, a transmission signal S1 with the frequency f1 of 125 kHz is generated, and is transmitted using the transmission channel 12 to the wheel module 9. There, it is received by the receiving unit 18 as a receiving signal E2, when an area of influence of the LF transmission antenna 6 and an area of influence of the LF receiving antenna 11 overlap at least partially.

These areas of influence are determined by the finite range based on the transmission signal capacity and by the antenna characteristics which depend on the respective antenna form. The LF transmission antenna 6 and the LF receiving antenna 11 comprise only a limited coupling area in relation to the circumference of the tire 2. In dependence on the tire rotation position, an entry and an exit is made into and from the coupling area, i.e. a time-limited coupling occurs. For each tire revolution, a coupling period TK results, the time duration of which depends on the current tire speed. The coupling area can be characterised using an angle segment in relation to a tire revolution, using a corresponding part of the circumference length of the tire 2, or using the coupling period TK, whereby the first two sizes, in contrast to the coupling period TK, do not depend on the tire speed.

During the coupling period TK, both power and data can be fed to the wheel module 9 via the transmission signal S1. The power management unit 21 receives power from the receiving signal E2 then received, and charges the power storage unit 22, from which all components of the wheel module 9 are supplied when the charging condition L is sufficiently high. The supply lines are shown in FIG. 2 with broken lines. The power management unit 21 also sustains the wheel module 9 during the query intervals, i.e. it ensures that the wheel module 9 remains ready to receive between two receiving signals E2 which differ from zero.

From the receiving signal E2, the internal clock unit 20 is also supplied, which derives from the frequency f1 of the receiving signal E2 a frequency f0 for pulsing the control unit 19 and a frequency f2 for returning a transmission signal S2 from the wheel module 9 to the control device 3. Here, the frequency f2, which in the example has a value of 13.56 MHz, is generated using frequency multiplication.

The transmission signal S2 contains at least data on the current tire condition, which is recorded using the sensors 24 to 26. It is transmitted via the transmission channel 13 back to the control device 3, and is received there as a receiving signal E1.

The facility 1 and in particular its transmission channels 12 and 13 are therefore designed for bi-directional communication between the control device 3 and the wheel module 9, as well as for an energy supply to the wheel module 9 via the control device 3.

The scope of the data which is transmitted via the transmission signal S2 to the control device 3 can be adjusted according to different operating parameters, such as the charging condition L of the power storage unit 22, the duration of the coupling period TK, the speed of the tire 2, the scope of the previous data transmission, or a specific data request from the control device 3. For the data transmission via the transmission signal S2, two different types of data telegram are available: on the one hand, the standard data telegram shown in FIG. 3, and on the other, the extended data telegram shown in FIG. 4.

Figure 3:
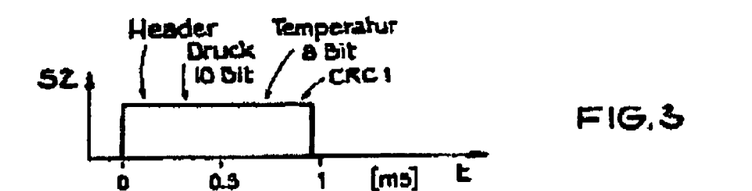
FIG. 3 shows a signal with a standard data telegram.
Figure 4:
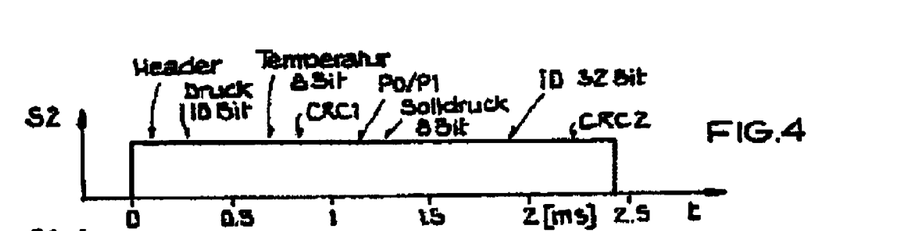
FIG. 4 shows a signal with an extended data telegram.

The shorter standard data telegram comprises in the exemplary embodiment a current pressure measured value in a 10 bit resolution, and a current temperature measured value in an 8 bit resolution. For example, it has a length of approximately 960 µs. In contrast, the extended data telegram has a length of 2.4 ms, for example, whereby the respective lengths of both data telegram types depend on the set baud rate and also from the length of the header. The extended data telegram contains additional information regarding the rated pressure of the tire 2 and/or for identification purposes. Based on the identification information which takes the form of a simple ident number or a characteristic identification for the tire, a tire change can be recognised, for example, and the rated pressure of the new tire 2 which may differ, can be adopted in the control device 3. If appropriate, the rated pressure can be derived in the control device 3 from the identification information transferred, so that an additional transfer of the rated pressure is not necessary.

The extended data telegram is in particular transmitted when the facility 1 is restarted after the power storage unit 22 is first fully charged. This situation, which arises when the vehicle is started up after a longer period of standstill, forms the basis of the time diagrams shown in FIG. 5. Different signal sequences are shown over time t.

From the control device 3, the low-frequency transmission signal S1 is first transmitted permanently. The receiving signal E2 which is then received in the wheel module 9 is then compiled, due to the limited coupling range, from individual—in the example given in FIG. 5, from two—receiving pulses, the time duration of which corresponds to the respective coupling period TK.

Figure 5:
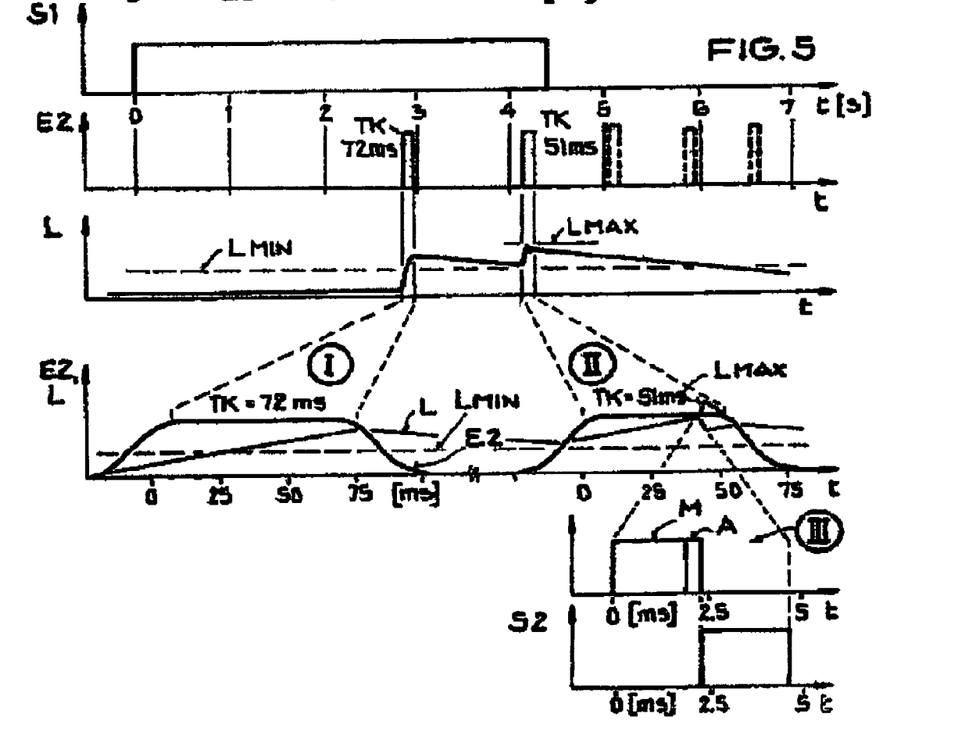
FIG. 5 shows time diagrams of signals while starting up and while an extended data telegram is being transmitted.

The entry into the low-frequency range can be detected in the wheel module 9 based on the increasing impulse edge of the respective receiving pulse.

During start-up, the power storage unit 22 is fully discharged. During the first coupling period TK shown with a duration of 72 ms, the power storage unit 22 is charged. The enlarged section, labelled 1, shows that the charging condition L has exceeded a threshold LMIN for the necessary minimum charge, but has not yet reached a prespecifiable maximum value, LMAX, for example for a full charge. This occurs only during the following coupling period TK (see section II).

When the prespecified maximum charging condition LMAX is reached, the data transmission from the wheel module 9 to the control device 3 is released and started. In the example shown in FIG. 5, this still occurs within the same coupling period TK (see section III). The control unit 19 triggers a current measured value recording M by the sensors 24 to 26, and a stimulation A of a transmission oscillator in the transmission unit 17. The measured value recording M lasts approximately 1 to 2 ms, and the stimulation A of the transmission oscillator approximately 0.3 ms (see upper time diagram from section III). Then, a transmission signal S2 is transmitted with an extended data telegram (see lower time diagram from section III). As a result of these activities of the wheel module 9, the charging condition L is again reduced, but initially still remains above the threshold value LMIN.

In the control device 3, the receiving signal E1 is received and then the transmission of the transmission signal S1 is ended. Subsequently, when the coupling range is passed through, no receiving pulses are received in the wheel module 9 until a new query is presented by a transmission signal S1 which differs from zero. In FIG. 5, the following—theoretically possible—coupling periods TK are therefore only indicated by broken receiving pulses. Due to the lack of infeed of new charging power, the charging condition L is reduced back to below the threshold value LMIN.

In contrast to the example given in FIG. 5, it is also possible that after the maximum charging condition LMAX has been reached, the data transmission to the control device 3 is only started at the beginning of the following coupling period TK. The transmission of the transmission signal S2 is then triggered by the increasing pulse edge of the next receiving pulse in the receiving signal E2. As a result, a complete transmission, as far as possible, of the extended data telegram is secured. The decision as to whether the data transmission to the control device 3 should be started immediately (=untriggered) or triggered when the maximum charging condition LMAX is reached can also be made dependent on the current tire speed and thus from the current duration of the coupling period TK.

The detection of the increasing pulse edges in the receiving signal E2 corresponds to a field recognition of the electromagnetic field of the transmitted transmission signal S1, as soon as the LF receiving signal 11 enters the coupling range (=antenna overlap) as a result of the tire speed. A transmission of the transmission signal S2 which is synchronised with this entry time point also guarantees, even with a high tire speed resulting from a vehicle speed of up to 300 km/h a defined and secure transmission of the data telegram during the coupling period TK.

The transmission of an extended data telegram or a standard data telegram occurs automatically in normal operation. If the wheel module 9 is discharged, such as while starting up, an extended data telegram is deposited. If the wheel module 9 is fully charged during a coupling period TK, it immediately transmits an extended data telegram. Otherwise, power is collected over several tire revolutions until the maximum charging condition LMAX is reached, in order to then transmit, triggered, the extended data telegram when a coupling period TK is next begun. When further continuous querying occurs via the transmission signal S1, the charging condition L remains above the threshold value LMIN (=reset threshold). After the first transmission of an extended data telegram, only standard data telegrams are transmitted from the wheel module 9 (=fast mode). Preferably, this is triggered in each case by the beginning of a coupling period TK. An extended data telegram is only then transmitted (=slow mode) when the charging condition L has sunk below the threshold value LMIN, or when an express request is made, for example from the control device 3 by transmitting a corresponding command, or due to the fact that within the low-frequency transmission signal S1, a brief transmission gap of several milliseconds is inserted.

Figure 6:
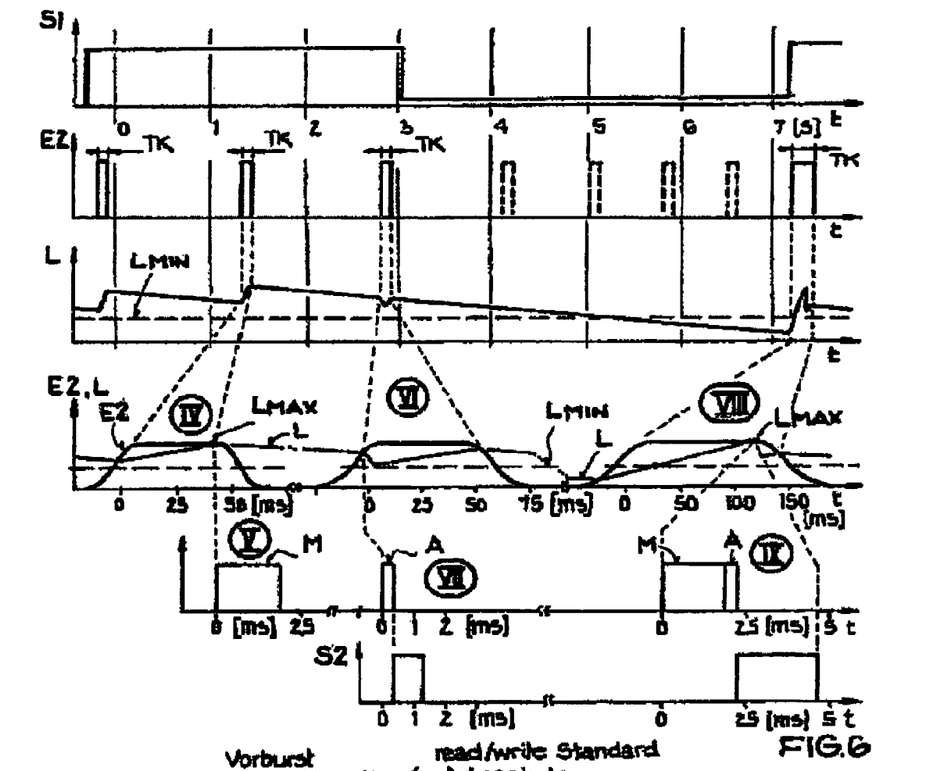
FIG. 6 shows time diagrams of signals during a transfer from a standard data telegram to an extended data telegram.

The transfer from a standard data telegram to an extended data telegram is shown in FIG. 6. At the beginning, the facility 1 is in fast mode, i.e. when a query is made by the transmission signal S1, the power storage unit 22, the charging condition of which L has not sunk below the threshold value LMIN, is first charged up during one or more coupling periods TK, until it has reached the maximum value LMAX again (see enlarged section IV). At the end of the coupling period TK, within which the complete charge up has been completed, the measured value recording M is started, triggered by the falling pulse edge of the corresponding receiving pulse in the receiving signal E2 (see section V). At the beginning of the next coupling period TK, the stimulation A of the transmission oscillator, and then the transmission of the transmission signal S2 with a standard data telegram is initiated, triggered by the increasing pulse edge of the corresponding receiving pulse (see sections VI and VII).

A longer time phase follows, within which now query is made, so that the charging condition L falls below the threshold value LMIN, and the wheel module 9 changes to slow mode operation. With the next query via the transmission signal S1, in the example shown, within a single coupling period TK, the complete charge up to the maximum charging condition LMAX and immediately following the measured value recording M, the stimulation A of the transmission oscillator and the transmission of the transmission signal S2 with an extended data telegram occurs (see sections VIII and IX).

Aside from the charging condition L, the selection of the data telegram type to be transmitted can also be made dependent on the tire speed. The tire speed, which can be derived from a vehicle velocity v determines the duration of the coupling period TK. Thus with a vehicle velocity v of 5 km/h or 120 km/h, a coupling period TK results of 108 ms or 4.5 ms. The current tire speed in the wheel module 9, which is calculated for example using a speed sensor or the time difference between two receiving pulses and the known rolling circumference, is compared with a speed threshold value. When the speed threshold value is not reached, for example when a request in this regard is sent by the control device 3, an extended data telegram can be transmitted. When the speed threshold value is exceeded, an extended data telegram is always transmitted.

The permanent data storage unit 23 of the wheel module 9 can be described in a targeted manner and/or read off while driving via the control device 3, but also while the ASICs and the tire 2 are being produced, or during a vehicle service via a hand-held control device. The hand-held control device enables communication with the wheel module 9. Aside from power transfer, the transmission signals S1 can also be used to transmit data and commands.

The data or command transfer is initiated with the standard transmission signal S1 used for querying the wheel module 9 with a 125 kHz constant carrier. When the charging condition L is at a sufficiently high level, the wheel module 9 attempts to deposit a standard data telegram. As soon as the control device 3 recognises the header of the standard data telegram in the receiving signal E1, it interrupts the 125 kHz permanent carrier of the transmission signal S1 for approximately 1 ms. As a result of this transmission gap, the transmission procedure is interrupted in the wheel module 9, and instead, a data/command receiving path is activated. Then the control device 3 starts to transmit the data/command in the transmission signal S1. Instead of the interruption, a characteristic zero sequence can be provided in the transmission signal S1, depending on the type of modulation used, which is recognised by the wheel module 9.

Figure 7:
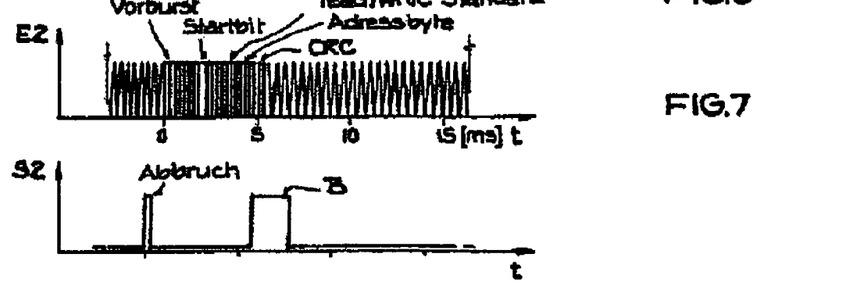
FIG. 7 shows time diagrams of signals during data transmission to the wheel module.

FIG. 7 shows the relevant sections of the time progression of the receiving signal E2 and the transmission signal S2 during data transmission from the control device 3 to the wheel module 9. In the receiving signal E2 shown above, the change from the 125 kHz constant carrier to the data/command transmission and in the transmission signal S2 shown below, the abortion of the standard data telegram which follows after approximately 300 μs can be seen. After the data and/or the command is received, a confirmation B is given if required, for example in the form of 32 bit block data, in the transmission signal S2.

As a result of this procedure, a synchronisation to the beginning of the coupling period TK is secured, and the available coupling range is used to the highest degree of efficiency, so that with a vehicle speed of up to approximately 50 km/h, data and/or commands can be transmitted to the wheel module 9.

In this way, different commands and data can be transmitted to the wheel module 9. Examples are a read/write command, which causes the data storage unit 23 to be read off or described, error messages, a command to transfer to a test mode or a confirmation of receipt. A read command can be used to query in particular other information from the wheel module 9 which is not already included in the data telegrams.

The data queried in this manner (e.g. 32 Bits) is transmitted in one of the forthcoming coupling periods TK to the control device 3.

The data transmitted to the control device 3 can be an error telegram. Thus, the control device 3 is shown for example an error in the measured value recording of one of the sensors 24 to 26, a receiving error, a calibration error or an error while describing the data storage unit 23. On the other hand, a successful description of the data storage unit 23 can also be reported. Furthermore, the control device 3 can switch into a temporary standby mode via a command transmitted by the wheel module 9, or even switch off completely, for example when the power storage unit 22 is full.

Figure 8:
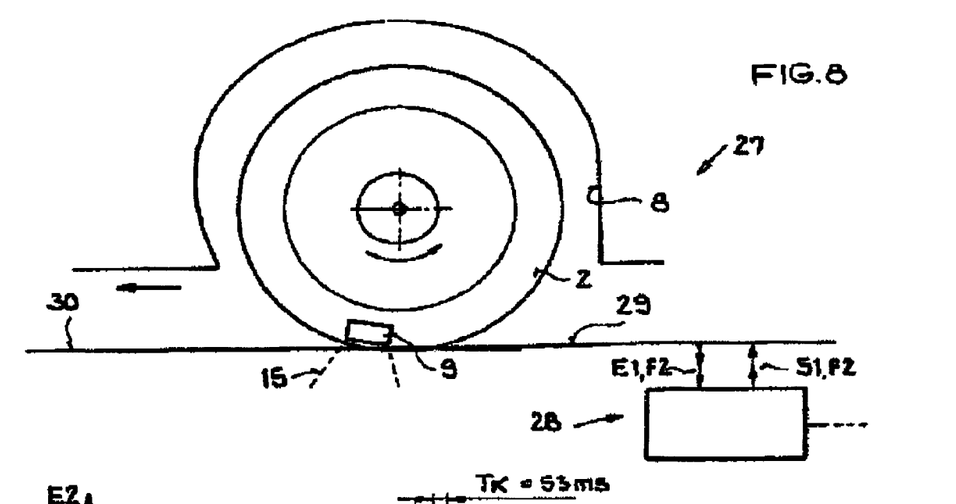
FIG. 8 shows an exemplary embodiment of a facility for data transmission between a control device with ground antenna and a wheel module.

FIG. 8 shows another exemplary embodiment of a facility 27 for wireless data transmission. The facility 27 does not contain a control device 3 which is arranged in the wheel housing 8, but a control device 28 with a ground antenna 29 which is integrated into a road surface 30. From the schematic view shown in FIG. 8 it cannot be seen that the ground antenna 29 comprises a LF ground transmission antenna and a HF ground receiving antenna. Both a formed by conducting loops laid in the road surface 30. They can be constructed as distributed antenna arrays, or be formed from several partial antennae which are distributed. The ground antenna 29 is arranged at least in the direction in which it is rolled over by the tire 2, and is at least as long as the roll circumference of the tire 2, so that when it is rolled over, a coupling with the wheel module 9 occurs.

The functionality of the facility 27 with the ground antenna 29 will now be described below with reference to FIG. 9.

As a result of the facility 27, measured values for the tire condition can also be recorded without any alteration on the vehicle. The ground antenna 29 is preferably arranged at a point within the road surface 30 which is regularly passed over by the vehicle, such as the entrance/exit to an industrial premises or a garage.

The ground antenna 29 comprises, in the direction in which it is rolled over by the tire 2, a coupling length which enables as a minimum the full charging of the power storage unit 22 and the transfer of data within a coupling period TK.

Figure 9:
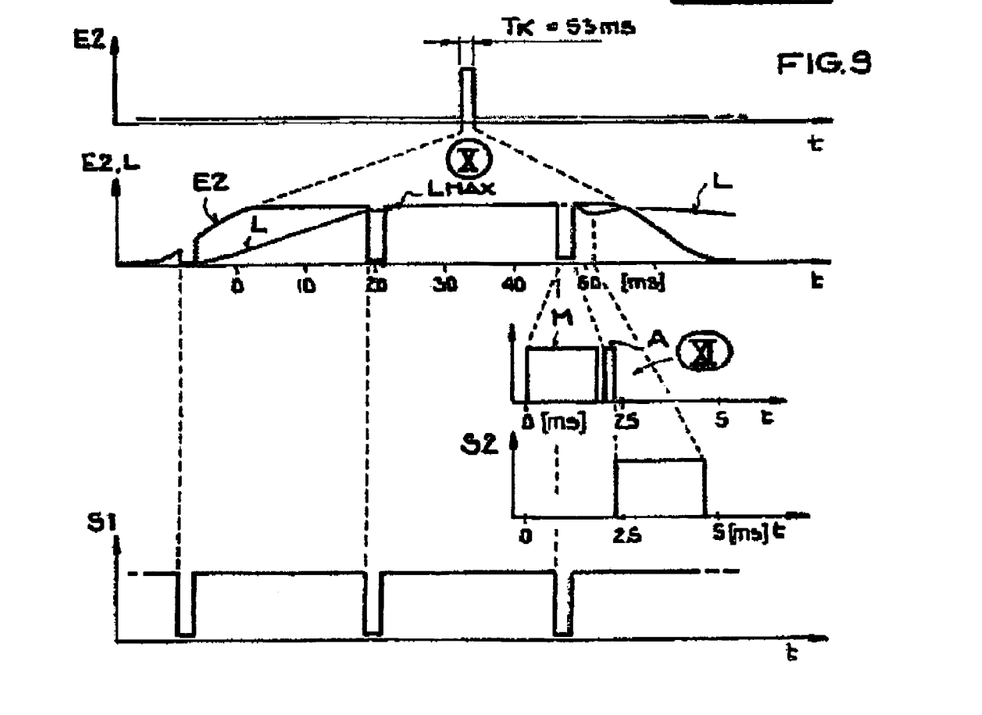
FIG. 9 shows time diagrams of signals while the ground antenna according to FIG. 8 is being driven over.

The corresponding signals are shown in FIG. 9. The control device 29 transmits a transmission signal S1, which comprises brief signal interruptions (=transmission gaps) of the low-frequency constant carrier in the range of 2 to 5 ms. As a result, an extended data telegram is forced in the transmission signal S2 transmitted back from the wheel module 9. The receiving signal E2 contained in the wheel module 9 also has brief signal interruptions (see the enlarged section X).

The brief signal interruptions also mean that for a wheel module 9 which is set for a triggered transmission when the maximum charging condition LMAX is reached, the beginning of a new coupling period TK is simulated which produces the triggering. With the decreasing pulse edge of the brief signal transmissions, the measured value recording M is initiated, and with the increasing pulse edge of the brief signal transmissions, the stimulation A of the transmission oscillator is initiated. Then, the transmission signal S1 is transmitted with an extended data telegram (see section XI).

The control device 28 with the ground antenna 29 can thus also be used in connection with the control device 3 arranged in the wheel housing 8, without a functional error occurring.

With a further exemplary embodiment, the facility 1 is designed for a frequency f2 of 433.92 MHz. In contrast to a frequency f2 of 13.56 MHz, in which the high-frequency transmission (=up link) comprises a similarly limited coupling range as the low-frequency transmission (=down link), at 433.92 MHz, the coupling between the HF transmission antenna 10 and the HF receiving antenna 7 is always given, regardless of the tire rotation position. Assuming that a sufficient charging condition L is provided, the transmission can then occur from the wheel module 9 to the control device 3 at any time, i.e. in particular also untriggered.

Figure 10:
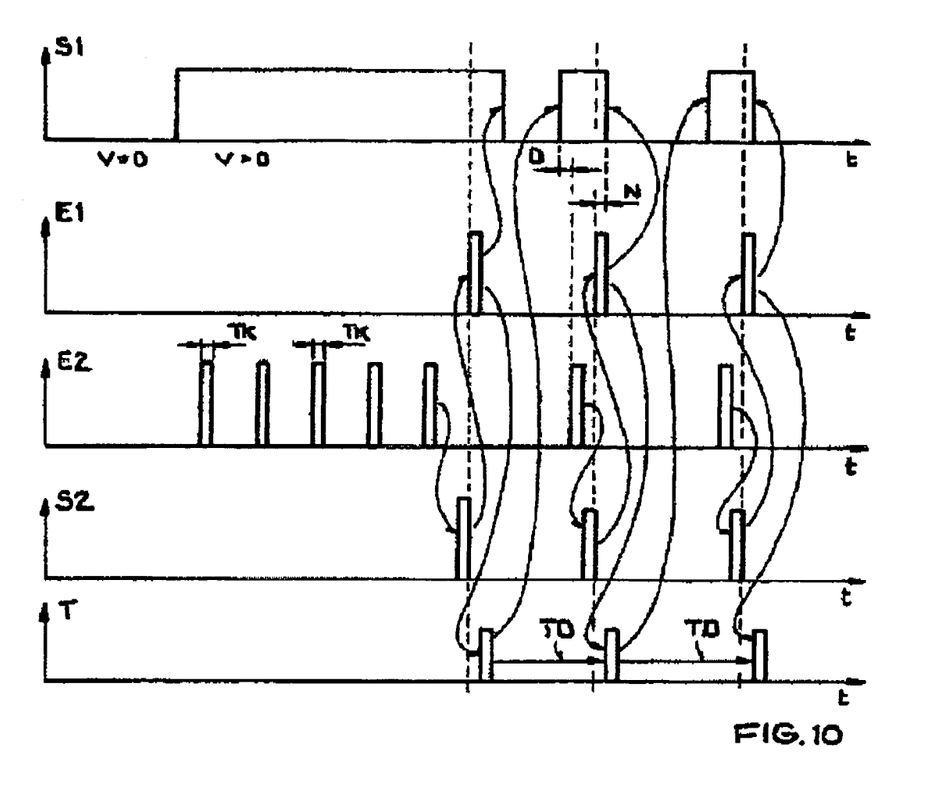
FIG. 10 shows time diagrams of signals with an alternative operation of the facility according to FIGS. 1 and 2.

The corresponding signals are shown in FIG. 10. After start-up (v>0), the largely discharge power storage unit 22 is initially charged using a permanently transmitted, low-frequency transmission signal S1. The receiving signal E2 contains individual receiving pulses as a result of the continued limited coupling for the low-frequency transmission. When the maximum charging condition LMAX is reached, the transmission signal S2 is transmitted without triggering at the beginning of a low-frequency coupling period TK. After it has been received in the control device 3, the transmission of the transmission signal S1 is stopped up to the next low-frequency coupling period TK.

Its beginning is forecast in the control unit 3 using the measured value delivered by the speed sensor 16 and a trigger signal T. After each receiving pulse from the receiving signal E1, a time market is set in the trigger signal T, on the basis of which the control device 3, taking into account a current revolution duration TD of the tire 2 calculated from the speed measured value, determines the anticipated beginning of the next low-frequency coupling period TK. With a prespecifiable time run-up O, the control device 3 then re-starts the transmission of the transmission signal S1, in order to end it again with a time after-run N, which is also prespecifiable, as soon as the corresponding response has been received from the wheel module 9.

In this exemplary embodiment, a current data telegram is therefore requested from the wheel module 9 and transmitted to the control device 3 during each low-frequency coupling period TK.

In principle, the start of the transmission signal S1 can be initiated in another manner. A marking could be applied to a rotating tire 2 or to a corresponding axis, which triggers a time element in the control device 3 with each revolution. The time element releases the transmission of the transmission signal S1 after a fixed prespecifiable or an adaptively determined time delay.

The run-up O and the after-run N ensure that for the entire duration of each low-frequency coupling period TK, a transmission signal S1 which differs from zero is applied for querying and for supplying power to the wheel module 9. On the other hand, the control device 3 normally only transmits the transmission signal S1 when a low-frequency coupling can be anticipated. As a result, the wasteful radiation of LF transmitting power from the control device 3 is prevented.

The invention claimed is:

1. A procedure for wireless transmission between a wheel module (9) arranged in a tire (2) and a control device (3; 28) arranged outside the tire (2), the method comprising:
   transferring a first transmission signal (S1) from an antenna (6) of the control device (3; 28) to an antenna (11) of the wheel module (9);
   transmitting data via a second transmission signal (S2) from the wheel module (9) to the control device (3; 28), wherein a different frequency is provided for the first transmission signal (S1) than for the second transmission signal (S2);
   receiving by the antenna (11) of the wheel module the first transmission signal (S1), during a coupling period (TK) within which when the tires (2) are rotating, an also rotating sphere of influence (15) of the antenna (11) of the wheel module (9) and a stationary sphere of influence (14) of the antenna (6) of the control device (3; 28) partially overlap; and
   recognizing a beginning of the coupling period (TK) is recognised by the wheel module (9), wherein the transmission of data from the wheel module (9) to the control device (3; 28) is started after the coupling period (TK) begins, wherein a speed of the tire (2) or a size which is proportional to it is recorded and compared with a speed threshold value, and the second transmission signal (S2) can be transmitted with an extended data telegram in particular only when the speed threshold value is not reached.

2. A procedure according to claim 1, wherein the frequency (1) of the first transmission signal (S1) is lower than the frequency of the second transmission signal (S2).

3. A procedure according to claim 1, wherein power is gained from the first transmission signal in order to supply the wheel module (9).

4. A procedure according to claim 3, wherein with the power gained, a power storage unit (22) is charged and the data transmission from the wheel module (9) to the control device (3; 28) is started after a prespecified charging condition (LMAX) of the power storage unit (22) has been started.

5. A procedure according to claim 4, wherein the second transmission signal (S2) is transmitted with an extended data telegram when the power storage unit (22), assuming that a significant discharge has occurred, has achieved the prespecified charging condition (LMAX).

6. A procedure according to claim 5, wherein the second transmission signal (S2) is transmitted with a standard data telegram when a charging condition (L) of the power storage unit has not fallen below a prespecified charging condition threshold value (LMIN) since the previous data transmission from the wheel module (9) to the control device (3; 28).

7. A procedure according to claim 1, wherein the first transmission signal (S1) is transmitted from the control device (3; 28) at least partially overriding several coupling periods (TK).

8. A procedure according to claim 1, wherein data from the control device (3; 28) to the wheel module (9) is transmitted by means of the control device (3; 28);
   after an at least partial reception of the second transmission signal (S2) in the first transmission signal (S1), a prespecified interruption is executed, or a prespecified zero sequence is transmitted;
   the first transmission signal (S1) is then loaded with the data to be transmitted from the control device (3; 28) to the wheel module (9) and in the wheel module (9);
   the interruption or zero sequence is recognised in the first transmission signal (S1); and
   the first transmission signal (S1) is received with the data from the control device (3; 28).

9. A procedure according to claim 1, wherein the first and the second transmission signal (S1, S2) is transmitted or received using a ground antenna (29) of the control device (28) arranged in a road surface (30).

10. A procedure for wireless transmission between a wheel module (9) arranged in a tire (2) and a control device (3; 28) arranged outside the tire (2), the method comprising:
   transferring a first transmission signal (S1) from an antenna (6) of the control device (3; 28) to an antenna (11) of the wheel module (9);
   transmitting data via a second transmission signal (S2) from the wheel module (9) to the control device (3; 28), wherein a different frequency is provided for the first transmission signal (S1) than for the second transmission signal (S2);

receiving by the antenna (11) of the wheel module the first transmission signal (S1), during a coupling period (TK) within which when the tires (2) are rotating, an also rotating sphere of influence (15) of the antenna (11) of the wheel module (9) and a stationary sphere of influence (14) of the antenna (6) of the control device (3; 28) partially overlap; and recognizing a beginning of the coupling period (TK) is recognised by the wheel module (9), wherein the transmission of data from the wheel module (9) to the control device (3; 28) is started after the coupling period (TK) begins, wherein a current measured value of at least one tire condition sensor (24, 25, 26) which is arranged in the tire (2) is transmitted using standard data telegrams which are included in the second transmission signal (S2) from the wheel module (9) to the control device (3; 28).

11. A procedure for wireless transmission between a wheel module (9) arranged in a tire (2) and a control device (3; 28) arranged outside the tire (2), the method comprising:

transferring a first transmission signal (S1) from an antenna (6) of the control device (3; 28) to an antenna (11) of the wheel module (9);

transmitting data via a second transmission signal (S2) from the wheel module (9) to the control device (3; 28), wherein a different frequency is provided for the first transmission signal (S1) than for the second transmission signal (S2);

receiving by the antenna (11) of the wheel module the first transmission signal (S1), during a coupling period (TK) within which when the tires (2) are rotating, an also rotating sphere of influence (15) of the antenna (11) of the wheel module (9) and a stationary sphere of influence (14) of the antenna (6) of the control device (3; 28) partially overlap; and recognizing a beginning of the coupling period (TK) is recognised by the wheel module (9), wherein the transmission of data from the wheel module (9) to the control device (3; 28) is started after the coupling period (TK) begins, wherein a current measured value of at least one tire condition sensor (24, 25, 28) arranged in the tire (2) together with a set value for this measured value or with a characteristic identification of the tires (2) is transmitted using extended data telegrams included in the second transmission signal (S2) from the wheel module (9) to the control device (3; 28).

* * * * *